US010836911B2

(12) United States Patent
Kagimasa et al.

(10) Patent No.: US 10,836,911 B2
(45) Date of Patent: Nov. 17, 2020

(54) FILLER COMPOSITION, FILLER, AND METHOD FOR MANUFACTURING FILLER

(71) Applicants: DAI-ICHI KOGYO SEIYAKU CO., LTD., Kyoto (JP); OSAKA SODA CO., LTD., Osaka (JP)

(72) Inventors: Toshio Kagimasa, Kyoto (JP); Nahoko Izaki, Kyoto (JP); Shoukichi Nakamura, Osaka (JP); Tomoyuki Ichino, Osaka (JP); Ryota Fukitani, Osaka (JP)

(73) Assignees: Dai-Ichi Kogyo Seiyaku Co., Ltd., Kyoto (JP); Osaka Soda Co., Ltd., Osaka (JP)

( * ) Notice: Subject to any disclaimer, the term of this patent is extended or adjusted under 35 U.S.C. 154(b) by 59 days.

(21) Appl. No.: 15/321,551

(22) PCT Filed: Jun. 26, 2015

(86) PCT No.: PCT/JP2015/068517
§ 371 (c)(1),
(2) Date: Dec. 22, 2016

(87) PCT Pub. No.: WO2016/002653
PCT Pub. Date: Jan. 7, 2016

(65) Prior Publication Data
US 2017/0158861 A1  Jun. 8, 2017

(30) Foreign Application Priority Data
Jul. 4, 2014 (JP) .................. 2014-139192

(51) Int. Cl.
| | |
|---|---|
| *C09C 1/30* | (2006.01) |
| *C08K 5/548* | (2006.01) |
| *C08K 3/36* | (2006.01) |
| *C08K 5/17* | (2006.01) |
| *C01B 33/18* | (2006.01) |
| *C08L 71/02* | (2006.01) |
| *C08K 5/09* | (2006.01) |
| *C09C 3/10* | (2006.01) |
| *C08K 9/06* | (2006.01) |
| *C09C 3/00* | (2006.01) |
| *C09C 3/04* | (2006.01) |
| *C09C 3/12* | (2006.01) |

(52) U.S. Cl.
CPC .............. *C09C 1/309* (2013.01); *C01B 33/18* (2013.01); *C08K 3/36* (2013.01); *C08K 5/09* (2013.01); *C08K 5/17* (2013.01); *C08K 5/548* (2013.01); *C08K 9/06* (2013.01); *C08L 71/02* (2013.01); *C09C 1/3027* (2013.01); *C09C 1/3072* (2013.01); *C09C 1/3081* (2013.01); *C09C 3/006* (2013.01); *C09C 3/043* (2013.01); *C09C 3/10* (2013.01); *C09C 3/12* (2013.01); *C09C 1/3063* (2013.01)

(58) Field of Classification Search
None
See application file for complete search history.

(56) References Cited

U.S. PATENT DOCUMENTS

| | | | | |
|---|---|---|---|---|
| 6,342,560 | B1 * | 1/2002 | Okel .................. | B60C 1/00 106/468 |
| 6,384,125 | B1 * | 5/2002 | Bergstrom ........... | B60C 1/00 523/213 |
| 6,433,065 | B1 * | 8/2002 | Lin .................... | C08K 5/103 524/492 |
| 6,518,354 | B1 * | 2/2003 | Suzuki ............... | C08L 95/00 516/77 |
| 6,649,684 | B1 * | 11/2003 | Okel ................... | B82Y 30/00 106/468 |
| 6,736,891 | B1 * | 5/2004 | Bice .................. | B82Y 30/00 106/287.1 |
| 2002/0107316 | A1 * | 8/2002 | Bice .................. | B82Y 30/00 524/493 |
| 2003/0130535 | A1 | 7/2003 | Deschler et al. | |
| 2003/0176559 | A1 * | 9/2003 | Bice .................. | B82Y 30/00 524/492 |
| 2003/0181557 | A1 * | 9/2003 | Suzuki ............... | C08J 3/03 524/334 |
| 2004/0131570 | A1 * | 7/2004 | Suenaga ............. | A61K 8/0241 424/70.12 |
| 2004/0152811 | A1 * | 8/2004 | Lin .................... | C08K 5/31 524/261 |
| 2004/0225038 | A1 * | 11/2004 | Lin .................... | B60C 1/00 524/109 |

(Continued)

FOREIGN PATENT DOCUMENTS

| | | |
|---|---|---|
| JP | 2002-275311 A | 9/2002 |
| JP | 2003-510208 | 3/2003 |

(Continued)

OTHER PUBLICATIONS

European Search Report dated Jan. 16, 2018 in European Application No. 15815095.3.

(Continued)

*Primary Examiner* — Colleen P Dunn
*Assistant Examiner* — Ross J Christie
(74) *Attorney, Agent, or Firm* — Mintz Levin Cohn Ferris Glovsky and Popeo, P.C.; David G. Conlin; Joohee Lee

(57) ABSTRACT

In order to provide a filler composition for fabricating a high-performance filler achieving good productivity while preventing worsening of a working environment and production of a VOC and to provide a filler and a method for producing the filler, a filler composition of the present invention contains wet silica, a polyoxyethylene unsaturated fatty acid ester, and a sulfur-containing silane coupling agent.

23 Claims, No Drawings

(56) References Cited

U.S. PATENT DOCUMENTS

| | | | |
|---|---|---|---|
| 2005/0131107 A1* | 6/2005 | Okel | B60C 1/00 523/216 |
| 2005/0176852 A1* | 8/2005 | Okel | B82Y 30/00 523/216 |
| 2010/0004359 A1* | 1/2010 | Wang | B60C 1/00 524/27 |
| 2010/0063178 A1* | 3/2010 | Hogan | C08K 5/12 523/157 |
| 2010/0071818 A1* | 3/2010 | Hergenrother | C08G 77/26 152/209.1 |
| 2010/0132868 A1* | 6/2010 | Hergenrother | B60C 1/00 152/564 |

FOREIGN PATENT DOCUMENTS

| | | |
|---|---|---|
| JP | 2003-531215 | 10/2003 |
| JP | 2005-35889 | 2/2005 |
| JP | 2010-059272 | 3/2010 |
| JP | 2011-063690 | 3/2011 |
| JP | 2014-031419 | 2/2014 |
| WO | 01/12733 | 2/2001 |
| WO | 01/21715 | 3/2001 |
| WO | 2016/002654 A1 | 1/2016 |

OTHER PUBLICATIONS

Office Action dated May 22, 2018 in corresponding Japanese patent application No. 2014-139192.

* cited by examiner

FILLER COMPOSITION, FILLER, AND METHOD FOR MANUFACTURING FILLER

CROSS REFERENCE TO RELATED APPLICATIONS

This application is the U.S. national stage pursuant to 35 U.S.C. § 371, of Japanese International Application Ser. No. PCT/JP2015/068517, filed Jun. 26, 2015 and published in Japanese on Jan. 7, 2016 as publication WO 2016/002653 A1, which claims the benefit of Japanese Patent Application Serial Nos. 2014-139192, filed Jul. 4, 2014, the entire contents of which are hereby incorporated by reference in their entirety.

TECHNICAL FIELD

The present invention relates to a filler composition, a filler, and a method for producing the filler, and particularly relates to a filler composition having a specific composition, a filler, and a method for producing the filler.

BACKGROUND ART

In recent years, so-called fuel-efficient tires with excellent low-fuel consumption performance and excellent braking performance have become increasingly prevalent because of growing environmental awareness. The fuel-efficient tires generally contain silica and a silane coupling agent, which results in less heat generation of rubber, with the objective of achieving low fuel consumption. Further, from the viewpoint of resource saving, it would be desirable to reduce the amount of rubber used in a tire while maintaining low-fuel consumption performance and improving wear resistance of a tire. For the improvement in wear resistance, there is a tendency to increase the amounts of silica and of a silane coupling agent blended in a tire.

In the tire industry, a so-called integral blending method is generally employed in which silica and a silane coupling agent are separately blended into rubber and allowed to react with each other during kneading of the rubber. In the integral blending method, a reaction of a silane coupling agent with silica generates alcohol. The alcohol is released into an atmosphere. This leads to a worsened working environment and an increased volatile organic compound (VOC). Moreover, the integral blending method requires a long kneading time or kneading in multiple stages in order to sufficiently obtain a time of reaction between silica and a silane coupling agent. This causes a problem of decreased productivity of products.

In order to solve the above problems, various approaches have been proposed.

For example, there have been proposed techniques including (i) a technique for selecting long-chain alcohols as alkoxy groups of a silane coupling agent (see Patent Literature 1), (ii) a technique for producing chemically-modified silica (see Patent Literature 2), and (iii) a technique for surface-treating silica to which a treatment solution containing a sulfur-containing silane coupling agent, water, an alcohol, and a basic substance is applied (see Patent Literature 3).

CITATION LIST

Patent Literatures

[Patent Literature 1]
Japanese Patent Application Publication Tokukai No. 2005-35889 (Publication date: Feb. 10, 2005)

[Patent Literature 2]
Japanese Translation of PCT International Application, Tokuhyo No. 2003-531215 (publication date: Oct. 21, 2003)

[Patent Literature 3]
Japanese Patent Application Publication Tokukai No. 2011-63690 (Publication date: Mar. 31, 2011)

SUMMARY OF INVENTION

Technical Problem

Unfortunately, the aforementioned conventional techniques have a problem such that it is impossible to fabricate a high-performance filler achieving good productivity while preventing worsening of a working environment and production of a VOC.

For example, the technique disclosed in Patent Literature 1 can achieve prevention of production of a VOC by causing generation of an alcohol having a high boiling point, but cannot be expected to remedy the problem of productivity.

The technique disclosed in Patent Literature 2 requires a chemical modification treatment performed under a severe condition (specifically, at a pH of not greater than 2.5) and a neutralization treatment performed after the chemical modification treatment and thus requires a plurality of processes for the production. This causes problems in terms of productivity and economy.

According to the technique disclosed in Patent Literature 3, the silane coupling agent does not permeate into an aggregate of silica particles, and only a surface of the aggregate of silica particles is treated with the silane coupling agent. This causes a problem such that it is difficult to uniformly treat the whole aggregate of silica particles with the silane coupling agent.

The present invention has been attained in view of the above problems, and it is an object of the present invention to provide a filler composition for fabricating a high-performance filler achieving good productivity while preventing worsening of a working environment and production of a VOC and to provide a filler and a method for producing the filler.

Solution to Problem

The inventors of the present invention have conducted diligent research in view of the above problems, and have consequently discovered that surface treatment of wet silica with a sulfur-containing silane coupling agent in the presence of a polyoxyethylene unsaturated fatty acid ester achieves an efficient reaction between the wet silica and the sulfur-containing silane coupling agent (in other words, reduction in amount of unreacted portion of the sulfur-containing silane coupling agent), and this would solve the above problems. The inventors have thereby completed the present invention.

In order to solve the above problems, a filler composition of the present invention includes: wet silica, a polyoxyethylene unsaturated fatty acid ester; and a sulfur-containing silane coupling agent.

The filler composition of the present invention is preferably such that the wet silica is a wet silica slurry.

The filler composition of the present invention is preferably such that the sulfur-containing silane coupling agent is at least one selected from the group consisting of a sulfur-containing silane coupling agent represented by the following Formula I:

[Chem. 1]

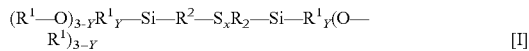

$(R^1—O)_{3-Y}R^1_Y—Si—R^2—S_xR_2—Si—R^1_Y(O—R^1)_{3-Y}$ [I]

wherein each $R^1$ is independently a monovalent hydrocarbon group having 1 to 18 carbon atoms, $R^2$ is a divalent hydrocarbon group having 1 to 9 carbon atoms, x is an integer of 2 to 6, and Y is an integer 0, 1, or 2, and a sulfur-containing silane coupling agent represented by the following Formula II:

[Chem. 2]

$(R^3—O)_{3-Y}R^3_Y—Si—R^4—SH$ [II]

wherein each $R^3$ is independently a monovalent hydrocarbon group having 1 to 18 carbon atoms, $R^4$ is a divalent hydrocarbon group having 1 to 9 carbon atoms, and Y is an integer 0, 1, or 2.

The filler composition of the present invention is preferably such that the polyoxyethylene unsaturated fatty acid ester has a HLB value of 5 to 10.

The filler composition of the present invention is preferably such that the filler composition contains 0.001 to 5 parts by weight of the polyoxyethylene unsaturated fatty acid ester per 100 parts by weight of the wet silica.

The filler composition of the present invention is preferably such that the wet silica has a BET specific surface area of 50 to 300 m²/g.

The filler composition of the present invention is preferably such that the filler composition further includes at least one selected from the group consisting of a basic substance and an acidic substance.

The filler composition of the present invention is preferably such that the basic substance is at least one selected from the group consisting of a monoalkyl amine, a dialkylamine and a trialkylamine each of which has an alkyl group of 1 to 24 carbon atoms and optionally may have a hydroxyl group.

The filler composition of the present invention is preferably such that the acidic substance is at least one selected from the group consisting of a (poly)carboxylic acid and a hydroxy acid each of which has 1 to 18 carbon atoms.

In order to solve the above problems, a production method of the present invention is a method for producing a filler composition of the present invention, the method including: mixing the wet silica, the polyoxyethylene unsaturated fatty acid ester, and the sulfur-containing silane coupling agent at 10° C. to 120° C. for 10 minutes to 24 hours.

The production method of the present invention is preferably such that the mixing is performed under a condition of pH of 4 to 10.

In order to solve the above problems, a filler of the present invention is the one obtained from the filler composition of the present invention.

In order to solve the above problems, the filler of the present invention is a filler including: wet silica; a polyoxyethylene unsaturated fatty acid ester; and a sulfur-containing silane coupling agent, the filler containing 1 to 20 parts by weight of the sulfur-containing silane coupling agent per 100 parts by weight of the wet silica, the filler containing 0.001 to 5 parts by weight of the polyoxyethylene unsaturated fatty acid ester per 100 parts by weight of the wet silica.

The filler of the present invention is preferably such that an extracted amount of the sulfur-containing silane coupling agent when the filler is subjected to solvent extraction accounts for not more than 2% by weight of an amount of the filler.

In order to solve the above problems, a filler production method of the present invention includes a drying step of drying the filler composition of the present invention.

The filler production method of the present invention is preferably such that the drying step includes a step of drying the filler composition by a spray-dry method.

The filler production method of the present invention is preferably such that the filler production method further includes a heating step of heating a dry product obtained by the drying step at 80° C. to 200° C. for 10 minutes to 24 hours.

Advantageous Effects of Invention

The present invention yields the effect of enabling fabrication of a high-performance filler achieving good productivity while preventing a worsening of a working environment and production of a VOC.

DESCRIPTION OF EMBODIMENTS

The description below deals with an embodiment of the present invention. The present invention is, however, not limited to such an embodiment. The present invention is not limited to the description of the arrangements below, but may be altered in various ways within the scope of the claims. Any embodiment or example based on a proper combination of technical means disclosed in different embodiments and examples is also encompassed in the technical scope of the present invention. All academic and patent literatures listed herein are incorporated herein by reference. Unless otherwise specified herein, any numerical range expressed as "A to B" means "not less than A (A or more) and not greater than B (B or less)".

[1. Filler Composition]

A filler composition of the present invention needs only to contain wet silica, a polyoxyethylene unsaturated fatty acid ester, and a sulfur-containing silane coupling agent. Other specific arrangements and applications of the filler composition are not particularly limited.

A filler obtained from the filler composition can be applicable to various uses. The uses of the filler are not particularly limited. For example, the filler can be used by being added to a composition of a substance such as a rubber, a resin, a coating, and a sealant.

The above-described filler composition achieves an efficient reaction between the wet silica and the sulfur-containing silane coupling agent in the presence of the polyoxyethylene unsaturated fatty acid ester. Consequently, a filler obtained from the filler composition achieves uniform binding of the sulfur-containing silane coupling agent to the surface of the silica.

More specifically, in a case where a filler is fabricated from the present filler composition, the wet silica and the sulfur-containing silane coupling agent, which are contained in the filler composition, react with each other. In so doing, the sulfur-containing silane coupling agent enters not only the surface of an aggregate of silica particles but also the interior of the aggregate of the silica particles due to the presence of the polyoxyethylene unsaturated fatty acid ester in a reaction system, so that the silica and the sulfur-containing silane coupling agent are bound to each other.

That is, the polyoxyethylene unsaturated fatty acid ester serves as an emulsifier for more uniformly dispersing the wet silica and the sulfur-containing silane coupling agent throughout the filler composition.

The aggregate of the silica particles to which the sulfur-containing silane coupling agent is uniformly bound in a large amount has an excellent function in a filler. For example, mixing the aggregate of the silica particles with a rubber realizes a tire with enhanced low-fuel consumption performance and enhanced wear resistance.

A filler obtained from the filler composition can be used by being kneaded with any of various compositions (such as, for example, a rubber composition). The present filler includes the wet silica and the sulfur-containing silane coupling agent which are uniformly reacted before the kneading, and the present filler thus enables prevention or reduction of alcohol generation during the kneading. This yields the effect of achieving improved working environment and VOC suppression.

Further, the use of the present filler eliminates the need to react the wet silica and the sulfur-containing silane coupling agent during the kneading. This makes it possible to reduce a kneading time and to do away with the need for kneading in multiple stages. This enables simplification of a process of production of a product (such as, for example, a tire) using the present filler.

The following will discuss the components contained in the filler composition in accordance with the present embodiment.

[1-1. Wet Silica]

As wet silica that can be used for the present filler composition, a publicly known wet silica can suitably be used. A specific arrangement and other specifics of the wet silica are not particularly limited. For example, wet silica fabricated by a wet method (a precipitation method, a gel method, or the like method) can be suitably used.

As compared to dry silica fabricated by a dry method, wet silica fabricated by a wet method has a large number of active hydroxyl groups (silanol) on a surface thereof and thus enables reactions between many of the hydroxyl groups and a silane coupling agent. Such wet silica also has a characteristic of being low in cost. Therefore, the use of wet silica as an ingredient of the present filler composition, as compared to the use of dry silica, brings about an advantage of modifying a product with a silane coupling agent with a higher degree of effectiveness and an advantage of enabling cost reduction of the product because wet silica is inexpensive.

A BET specific surface area of the wet silica is not particularly limited, but is preferably 50 $m^2/g$ to 300 $m^2/g$, more preferably 80 $m^2/g$ to 200 $m^2/g$, even more preferably 100 $m^2/g$ to 180 $m^2/g$, and particularly preferably 120 $m^2/g$ to 165 $m^2/g$. With a BET specific surface area falling within the above range, it is possible to enhance performance of a filler fabricated from the present filler composition. For example, mixture of the filler fabricated from the present filler composition with a rubber composition enables holding an increase in viscosity of a rubber and more uniform kneading of the filler and the rubber. Further, such mixture enables enhancement of wear resistance of the rubber.

Note that the BET specific surface area can be measured by using a TriStar II 3020 measuring apparatus manufactured by Shimadzu Corporation, in accordance with a protocol attached to the apparatus.

A form of the wet silica is not particularly limited, but is preferably a wet silica slurry, for example. Note that the term "wet silica slurry" as used herein means wet silica being dispersed in a solvent. In other words, the present filler composition may be a composition such that wet silica, a polyoxyethylene unsaturated fatty acid ester, and a sulfur-containing silane coupling agent are dispersed in the aforementioned solvent.

The above arrangement enables more uniform dispersion of the wet silica and the sulfur-containing silane coupling agent throughout the filler composition. The above arrangement further enables prevention of an increase in temperature of the filler composition to a temperature higher than necessary even when the filler composition is subjected to high-temperature heat treatment in a process of fabricating a filler. Since the temperature of the filler composition is not increased to a temperature higher than necessary, it is possible to prevent thermal decomposition of ingredients of the filler composition (including, for example, wet silica, a polyoxyethylene unsaturated fatty acid ester, and a sulfur-containing silane coupling agent) and a fabricated filler. As a result, it is possible to fabricate a filler having substantially the same composition as that of the filler composition. This makes it possible to facilitate quality control on the filler.

A solvent for dispersing the wet silica is exemplified by, but not particularly limited to, water, ketones such as acetone, alcohols such as ethanol, and ethers such as THF. Among these solvents, water is preferable. As the solvent, water is preferably used to more easily achieve uniform dispersion of wet silica and a sulfur-containing silane coupling agent when a polyoxyethylene unsaturated fatty acid ester (described later) is used in combination and to accelerate a reaction between wet silica and a sulfur-containing silane coupling agent.

The above-described wet silica slurry may be a wet silica slurry in a state of a semi-finished product obtained during fabrication of wet silica or may be a wet silica slurry obtained by fabricating wet silica that is a finished product and then dispersing the wet silica in a solvent.

A concentration of a solid content (wet silica) in the wet silica slurry is not particularly limited. However, the solid content accounts for preferably 5 to 50% by weight of the wet silica slurry, more preferably 5 to 40% by weight of the wet silica slurry, even more preferably 5 to 35% by weight of the wet silica slurry, still more preferably 8 to 30% by weight of the wet silica slurry, and particularly preferably 10 to 17% by weight of the wet silica slurry. A concentration solid content (wet silica) in the wet silica slurry within the above-described range achieves more uniform dispersion of the wet silica and the sulfur-containing silane coupling agent throughout the present filler composition and also more easily achieves mixing of the wet silica and the sulfur-containing silane coupling agent throughout the filler composition.

[1-2. Polyoxyethylene Unsaturated Fatty Acid Ester]

A polyoxyethylene unsaturated fatty acid ester that can be used in the present invention can be, but not particularly limited to, a publicly known one or a commercially available one. For example, the one obtained by addition polymerization of ethylene oxide to an unsaturated fatty acid by a well-known method can be used.

The polyoxyethylene unsaturated fatty acid ester is preferably the one obtained by addition polymerization of ethylene oxide to an unsaturated fatty acid having 12 to 26 carbon atoms, more preferably the one obtained by addition polymerization of ethylene oxide to an unsaturated fatty acid having 14 to 24 carbon atoms, even more preferably the one obtained by addition polymerization of ethylene oxide to an unsaturated fatty acid having 16 to 20 carbon atoms, and particularly preferably the one obtained by addition polymerization of ethylene oxide to an unsaturated fatty acid having 18 carbon atoms. The above arrangement achieves more efficient reaction between wet silica and a sulfur-containing silane coupling agent.

The number of unsaturated bonds contained in the unsaturated fatty acid may be, but not particularly limited to, one, two, three, four, or five or more.

The type of unsaturated bonds contained in the unsaturated fatty acid may be, but not particularly limited to, a double bond or a triple bond. It can be said that a double bond is more preferable from the viewpoint of more efficiently reacting wet silica and a sulfur-containing silane coupling agent and from the viewpoint of fabricating a filler at a low cost.

More specifically, the polyoxyethylene unsaturated fatty acid ester may be the one obtained by addition polymerization of ethylene oxide to palmitoleic acid, oleic acid, vaccenic acid, linoleic acid, linolenic acid, eleostearic acid, arachidonic acid, or nervonic acid.

Alternatively, the polyoxyethylene unsaturated fatty acid ester may be the one obtained by addition polymerization of ethylene oxide to a mixture containing two or more of the fatty acids listed above.

A hydrophile lipophile balance (HLB) value of the polyoxyethylene unsaturated fatty acid ester is not particularly limited, but is preferably 5 to 10, more preferably 6 to 10, and particularly preferably 7 to 9. Note that in the present invention, the HLB value is calculated based on a Griffin's equation. Based on the Griffin's equation, which is defined based on a formula weight of a hydrophilic group of a surfactant and a molecular weight of an entire molecule of the surfactant, the HLB value is calculated as follows: "HLB value=20×sum total of formula weights of hydrophilic portion/molecular weight". The above arrangement achieves more efficient reaction between wet silica and a sulfur-containing silane coupling agent.

The amount of the polyoxyethylene unsaturated fatty acid ester contained in a filler composition is not particularly limited. However, the amount of the polyoxyethylene unsaturated fatty acid ester is, for example, preferably 0.001 to 5 parts by weight, more preferably 0.001 to 4 parts by weight, even more preferably 0.001 to 3 parts by weight, still more preferably 0.002 to 2.5 parts by weight, further more preferably 0.005 to 2 parts by weight, and particularly preferably 0.01 to 1.8 parts by weight, per 100 parts by weight of the wet silica.

An amount of the polyoxyethylene unsaturated fatty acid ester within the above-described range achieves more uniform dispersion of the wet silica and the sulfur-containing silane coupling agent throughout the present filler composition. Such an amount further achieves reduction of the amount of residual polyoxyethylene unsaturated fatty acid ester in a filler produced from the filler composition. Consequently, it is possible to minimize various influences of the residual polyoxyethylene unsaturated fatty acid ester on a product (e.g., a rubber product) including a filler. Further, it is possible to reduce the amount of polyoxyethylene unsaturated fatty acid ester to be used. This makes it possible to fabricate a high-performance filler at a low cost.

[1-3. Sulfur-Containing Silane Coupling Agent]

The sulfur-containing silane coupling agent that can be used in the present invention is not particularly limited in its specific structure and can be a publicly known sulfur-containing silane coupling agent. For example, the sulfur-containing silane coupling agent is preferably at least one selected from the group consisting of a sulfur-containing silane coupling agent represented by the following Formula I:

[Chem. 3]

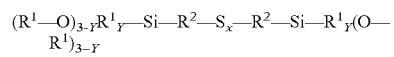
$$(R^1-O)_{3-Y}R^1_Y-Si-R^2-S_x-R^2-Si-R^1_Y(O-R^1)_{3-Y} \quad [I]$$

wherein each $R^1$ is independently a monovalent hydrocarbon group having 1 to 18 carbon atoms, $R^2$ is a divalent hydrocarbon group having 1 to 9 carbon atoms, x is an integer of 2 to 6, and Y is an integer 0, 1, or 2, and a sulfur-containing silane coupling agent represented by the following Formula II:

[Chem. 4]

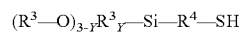
$$(R^3-O)_{3-Y}R^3_Y-Si-R^4-SH \quad [II]$$

wherein each $R^3$ is independently a monovalent hydrocarbon group having 1 to 18 carbon atoms, $R^4$ is a divalent hydrocarbon group having 1 to 9 carbon atoms, and Y is an integer 0, 1, or 2.

The number of carbon atoms in $R^1$ and $R^3$ is more preferably 1 to 12, even more preferably 1 to 8, and particularly preferably 1 to 4. This arrangement achieves more efficient reaction between wet silica and a sulfur-containing silane coupling agent.

The symbol x is more preferably 2 to 6, and particularly preferably 2 to 4. This is because this arrangement achieves reduction of scorching of a rubber while ensuring reactivity between the sulfur-containing silane coupling agent and the rubber.

The symbol Y is particularly preferably 0 or 1. This is because of the reason below. Specifically, with this arrangement, the sulfur-containing silane coupling agent has a plurality of reactive sites. This allows an increase in number of reactions between those reactive sites and silanol.

Such a sulfur-containing silane coupling agent is exemplified by, for example, bis(triethoxysilylpropyl)disulfide, bis(triethoxysilylpropyl)tetrasulfide, bis(triethoxysilylpropyl)polysulfide, bis(trimethoxysilylpropyl)disulfide, bis(trimethoxysilylpropyl)tetrasulfide, bis(diethoxymethylsilylpropyl)disulfide, bis(diethoxymethylsilylpropyl)tetrasulfide, 3-mercaptopropyltrimethoxysilane, 3-mercaptopropyltriethoxysilane, 3-mercaptopropylmethyldimethoxysilane, and 3-mercaptopropylmethyldiethoxysilane. However, the present invention is not limited to these examples.

The amount of sulfur-containing silane coupling agent contained in the filler composition is not particularly limited, but is preferably 1 to 20 parts by weight, more preferably 1 to 18 parts by weight, even more preferably 2 to 18 parts by weight, still more preferably 3 to 15 parts by weight, and particularly preferably 4 to 15 parts by weight, per 100 parts by weight of the wet silica. The above arrangement enables a large amount of sulfur-containing silane coupling agent to be efficiently bound to wet silica per unit of weight. The above arrangement also realizes a high-performance filler. For example, mixing the filler and a rubber enables enhancement in scorching and viscoelastic properties of a rubber.

[1-4. Other Ingredient(s)]

The present filler composition may contain another ingredient(s), in addition to the aforementioned wet silica, polyoxyethylene unsaturated fatty acid ester, and sulfur-containing silane coupling agent.

For example, the present filler composition may further contain at least one selected from the group consisting of a basic substance and an acidic substance.

Inclusion of a basic substance and/or an acidic substance accelerates hydrolysis of the sulfur-containing silane coupling agent. This is effective in causing reaction between the wet silica and the sulfur-containing silane coupling agent to further proceed.

A specific constitution of the basic substance is not particularly limited, but the basic substance can be at least one selected from the group consisting of a monoalkyl amine, a dialkylamine and a trialkylamine each of which has an alkyl group of 1 to 24 carbon atoms. In this case, a hydroxyl group may or may not be bound to the alkyl group. The number of hydroxyl groups bound to the alkyl group is not particularly limited. One hydroxyl group may be bound to the alkyl group. Alternatively, a plurality of hydroxyl groups may be bound to the alkyl group.

From the viewpoint of further enhancing the aforementioned effect derived from the basic substance, the basic substance specifically has the following constitution. That is, the basic substance is preferably at least one selected from the group consisting of a monoalkyl amine, a dialkylamine and a trialkylamine each of which has an alkyl group of 2 to 24 carbon atoms, and particularly preferably at least one selected from the group consisting of a dialkylamine and a trialkylamine each of which has an alkyl group of 4 to 24 carbon atoms. Moreover, it is more preferable that a hydroxyl group be bound to the alkyl group (In other words, the basic substance is more preferably an amine having a hydroxyl group.).

Such a basic substance is exemplified by, for example, methylamine, ethylamine, butylamine, octylamine, dimethylamine, diethylamine, dibutylamine, dioctylamine, trimethylamine, triethylamine, tributylamine, trioctylamine, ethanolamine, diethanolamine, triethanolamine, methylethanolamine, ethylethanolamine, butylethanolamine, dimethylethanolamine, diethylethanolamine, dibutylethanolamine, methyldiethanolamine, ethyldiethanolamine, butyldiethanolamine, and aminoethylethanolamine. However, the present invention is not limited to these examples.

A specific constitution of the acidic substance is not particularly limited, but the acidic substance can be at least one selected from the group consisting of a (poly)carboxylic acid and a hydroxy acid each of which has 1 to 18 carbon atoms.

From the viewpoint of further enhancing the effect derived from the acidic substance, the acidic substance specifically has the following constitution. That is, the acidic substance is preferably at least one selected from the group consisting of a (poly)carboxylic acid and a hydroxy acid each of which has 1 to 12 carbon atoms, more preferably at least one selected from the group consisting of a (poly) carboxylic acid and a hydroxy acid each of which has 2 to 12 carbon atoms, and particularly preferably at least one selected from the group consisting of a (poly)carboxylic acid and a hydroxy acid each of which has 3 to 8 carbon atoms.

Further, the acidic substance may contain a carbon-to-carbon double bond in its molecule. The acidic substance containing a double bond in its molecule is preferable because the acidic substance gets involved in vulcanization reaction and thus enables suppression of, for example, bloom and bleed.

Such an acidic substance is exemplified by, for example, acetic acid, butyric acid, myristic acid, stearic acid, malic acid, citric acid, succinic acid, tartaric acid, lactic acid, fumaric acid, and maleic acid. However, the present invention is not limited to these examples.

Each of the amounts of the basic substance and of the acidic substance contained in the present filler composition is not particularly limited, but is preferably 0.1 to 5 parts by weight, more preferably 0.1 to 3 parts by weight, even more preferably 0.3 to 2 parts by weight, and particularly preferably 0.5 to 2 parts by weight, per 100 parts by weight of the wet silica. The above arrangement enables further enhancement of the aforementioned effect derived from the basic substance and the aforementioned effect derived from the acidic substance.

The present filler composition may contain still another ingredient(s) in addition to the aforementioned ingredient(s), provided that such an ingredient(s) does not impair the effects of the present invention. For example, the present filler composition may contain any of the followings: fillers such as carbon black and calcium carbonate; process oil; wax; antioxidant; a scorch retarder; a tackifier; stearic acid; polyoxyethylene saturated fatty acid ester; zinc oxide; a processing aid; a vulcanization accelerator; a vulcanizing agent; and the like.

The amount of the still another ingredient contained in the present filler composition is not particularly limited, but may be 1 to 30 parts by weight or 1 to 15 parts by weight, per 100 parts by weight of the wet silica.

[2. Method for Producing Filler Composition]

A method for producing a filler composition in accordance with the present invention is not particularly limited, provided that it is a method such that the wet silica (e.g., a wet silica slurry), the polyoxyethylene unsaturated fatty acid ester, and the sulfur-containing silane coupling agent are sufficiently dispersed.

Alternatively, the present production method may be a method such that, in addition to the wet silica (e.g., a wet silica slurry), the polyoxyethylene unsaturated fatty acid ester, and the sulfur-containing silane coupling agent, the aforementioned other ingredients are sufficiently dispersed.

Note that, in the present production method, a commercially available stirring apparatus can be used as appropriate.

In the present production method, a temperature condition under which the mixing is performed is not particularly limited, but is preferably 0° C. to 120° C., more preferably 10° C. to 120° C., even more preferably 20° C. to 105° C., and particularly preferably 20° C. to 95° C. The above mixing temperature enables preventing the ingredients of the filler composition and a filler from being thermally decomposed. As a result, a composition of a filler in accordance with the present embodiment enables being reflective of the composition of the filler composition.

In the present production method, a mixing time is not particularly limited, but is preferably 5 minutes to 24 hours, more preferably 10 minutes to 24 hours, even more preferably 30 minutes to 4 hours, and particularly preferably 1 hour to 24 hours.

In the present production method, a condition under which the mixing is performed is preferably pH 4 to pH 10. Further, the pH is more preferably 4 to 9, and particularly preferably 4 to 7. The above condition of pH of 4 to 10 enables a small amount of acids or bases used to adjust pH during the production of the filler. Moreover, the above condition of pH of 4 to 10 enables preventing a sulfur-containing silane coupling agent and other ingredient(s) from being deposited on a wall surface or/and other place(s) of a container during the mixing.

[3. Filler]

A filler in accordance with the present invention needs only to be obtained from the aforementioned filler composition. Other specific arrangements, etc. are not particularly limited.

For example, the present filler can be a filler including: wet silica; a polyoxyethylene unsaturated fatty acid ester; and a sulfur-containing silane coupling agent, the filler containing 1 to 20 parts by weight of the sulfur-containing silane coupling agent per 100 parts by weight of the wet silica, the filler containing 0.001 to 5 parts by weight of the polyoxyethylene unsaturated fatty acid ester per 100 parts by weight of the wet silica. Alternatively, the above-described filler is interchangeable with a filler being formed from wet silica, a polyoxyethylene unsaturated fatty acid ester, and a sulfur-containing silane coupling agent, the filler containing 1 to 20 parts by weight of the sulfur-containing silane coupling agent bound to 100 parts by weight of the wet silica, the filler containing 0.001 to 5 parts by weight of the polyoxyethylene unsaturated fatty acid ester per 100 parts by weight of the wet silica.

The present filler may be the one containing 1 to 18 parts by weight of the sulfur-containing silane coupling agent, the one containing 2 to 18 parts by weight of the sulfur-containing silane coupling agent, the one containing 3 to 15 parts by weight of the sulfur-containing silane coupling agent, or the one containing 4 to 15 parts by weight of the sulfur-containing silane coupling agent, per 100 parts by weight of the wet silica.

Further, the present filler may be the one containing 0.001 to 5 parts by weight of the polyoxyethylene unsaturated fatty acid ester, the one containing 0.001 to 4 parts by weight of the polyoxyethylene unsaturated fatty acid ester, the one containing 0.001 to 3 parts by weight of the polyoxyethylene unsaturated fatty acid ester, the one containing 0.002 to 2.5 parts by weight of the polyoxyethylene unsaturated fatty acid ester, the one containing 0.005 to 2 parts by weight of the polyoxyethylene unsaturated fatty acid ester, the one containing 0.01 to 1.8 parts by weight of the polyoxyethylene unsaturated fatty acid ester, per 100 parts by weight of the wet silica.

In general, when a filler is subjected to solvent extraction, an unreacted portion of a sulfur-containing silane coupling agent is extracted from the filler. The amount of the extracted portion of the sulfur-containing silane coupling agent determines an efficiency of reaction between wet silica and the sulfur-containing silane coupling agent. In other words, a filler such that the amount of the extracted portion of the sulfur-containing silane coupling agent is smaller is judged to have a higher degree of efficiency of reaction between wet silica and a sulfur-containing silane coupling agent.

The aforementioned filler composition achieves an efficient reaction between the wet silica and the sulfur-containing silane coupling agent. Accordingly, the present filler is such that the amount of the extracted portion of the sulfur-containing silane coupling agent is small.

Specifically, the extracted amount of the sulfur-containing silane coupling agent when the present filler is subjected to solvent extraction accounts for preferably not more than 2% by weight of an amount of the filler and more preferably not more than 1% by weight of the amount of the filler. Furthermore, the order of preferences of the extracted amount, from lowest to highest, is as follows: not more than 0.9% by weight of the amount of the filler, not more than 0.8% by weight of the amount of the filler, not more than 0.7% by weight of the amount of the filler, not more than 0.6% by weight of the amount of the filler, not more than 0.5% by weight of the amount of the filler, not more than 0.4% by weight of the amount of the filler, not more than 0.3% by weight of the amount of the filler, not more than 0.2% by weight of the amount of the filler, and not more than 0.1% by weight of the amount of the filler.

A solvent used for the solvent extraction can be a solvent capable of dissolving the sulfur-containing silane coupling agent and not reacting with the sulfur-containing silane coupling agent. Examples of such a solvent include hydrocarbons such as hexane and heptane, ketones such as acetone and methyl ethyl ketone, esters such as ethyl acetate, and chloroform. However, the present invention is not limited to these examples.

The following will discuss an example method for calculating the extracted amount.

On a day after a filler is fabricated (approximately 16 hours after the fabrication of the filler), a solvent extraction test is conducted on the filler.

First, 10.0 g of filler is weighed into a glass container, and 50 ml of methyl ethyl ketone is then added to the glass container. Subsequently, the filler and methyl ethyl ketone in the glass container are stirred at 500 rpm for 10 minutes.

Then, a resulting mixture, which contains the methyl ethyl ketone and the filler, is subjected to filtration under reduced pressure to obtain a filtrate from which the filler has been removed. Further, a filtration residue containing the filler is rinsed 5 times with 5 mL of methyl ethyl ketone to collect the methyl ethyl ketone used for the rinsing.

The filtrate and the methyl ethyl ketone having been used for the rinsing and collected are mixed, after which a resulting mixed solution is concentrated under conditions of a reduced pressure of 20 mmHg and a temperature of 70° C. until the mixed solution reaches equilibrium. Subsequently, the weight of an extract collected after the concentration under the reduced pressure (in other words, an unreacted portion of the sulfur-containing silane coupling agent) is measured.

Then, the extracted amount is determined so as to be expressed as an extract's percentage by weight per 10.0 g of filler.

[4. Method for Producing Filler]

A method for producing a filler in accordance with the present invention is a method for fabricating the aforementioned filler by using the aforementioned filler composition. The present filler production method includes a drying step, and may further include a heating step, if necessary. The following will discuss the drying step and the heating step.

[4-1. Drying Step]

The drying step needs only to be a step of causing the filler composition to be reacted at a high temperature for a given period of time. Other specific arrangement is not limited. In the drying process, reaction between the wet silica and the sulfur-containing silane coupling agent occurs, with the result that a large amount of the sulfur-containing silane coupling agent is uniformly bound not only to a surface of an aggregate of silica particles but also to the interior of the aggregate of silica particles. Thus, the drying step may be considered as a reaction step.

Examples of a specific drying method used in the drying step include, but not particularly limited to, tray drying, a drum dryer, a rotary kiln, a vacuum heat dryer, and a spray dryer (spray-dry method). Among these drying methods, a spray dryer (spray-dry method) is preferable. This is because the spray dryer (spray-dry method) enables coating of a surface of silica with a silane coupling agent while suppressing aggregation of silica.

In a case where the spray drier (spray-dry method) is employed as the drying method, a spray system is not particularly limited and may be a nozzle system or may be a centrifugal spray system.

A drying temperature (e.g., a temperature of hot air for drying) is not particularly limited, but is preferably 60° C. to 1000° C. and more preferably 100° C. to 800° C. The drying temperature may be 200° C. to 900° C. In this case, the temperature of the filler immediately after the drying can be adjusted to 80° C. to 200° C. The above-described drying temperature enables the filler to be sufficiently dried and also enables preventing the ingredients in the filler composition and the filler from being thermally decomposed.

A drying time is not particularly limited. The drying time is, however, preferably 1 second to 24 hours and more preferably 1 second to 8 hours.

[4-2. Heating Step]

A method for producing a filler in accordance with the present embodiment may include a heating step of heating a dry product obtained by the drying step. Examples of a specific heating method used in the heating step include, but not particularly limited to, a commercially available oven.

A heating temperature (e.g., a temperature in the oven) and a heating time are not particularly limited. However, the dry product obtained by the drying step is heated preferably at 80° C. to 200° C. for 10 minutes to 24 hours, more preferably at 80° C. to 180° C. for 10 minutes to 12 hours, even more preferably at 100° C. to 160° C. for 30 minutes to 8 hours, and particularly preferably at 150° C. for 6 hours. The above-described heating temperature and heating time enable the filler to be sufficiently dried and also enables preventing the ingredients in the filler composition and the filler from being thermally decomposed.

EXAMPLES

The following will discuss Examples of the present invention and Comparative Examples. Note that the present invention is not limited to Examples below without departing from the spirit of the present invention.

Example 1: Production of Filler 1

To 2 kg of wet silica slurry which is an aqueous dispersion containing 15% by weight of Tokusil 233 (manufactured by OSC; BET specific surface area of 120 m$^2$/g), 0.9 g (0.3 parts by weight per 100 parts by weight of wet silica) of polyoxyethylene oleic acid ester (trade name: H-3549A (manufactured by Dai-ichi Kogyo Seiyaku Co., Ltd.); HLB value: 8) and 45 g (15 parts by weight per 100 parts by weight of wet silica) of sulfur-containing silane coupling agent (Cabrus 2B manufactured by Daiso Co., Ltd.) were added. Then, the resulting mixed solution was stirred at room temperature (approximately 23° C.) for 24 hours. Note that pH of the mixed solution was 6.

Subsequently, by a spray drier manufactured by Nihon Buchi, the mixed solution was dried under a condition of a hot air temperature of 200° C. to obtain a powder.

Further, the powder thus obtained was dried in an oven at 150° C. for 6 hours to obtain a filler 1.

Example 2: Production of Filler 2

To 2 kg of wet silica slurry which is an aqueous dispersion containing 10% by weight of Tokusil 233 (manufactured by OSC; BET specific surface area of 120 m$^2$/g), 0.4 g (0.2 parts by weight per 100 parts by weight of wet silica) of polyoxyethylene oleic acid ester (trade name: H-3549A (manufactured by Dai-ichi Kogyo Seiyaku Co., Ltd.); HLB value: 8), 20 g (10 parts by weight per 100 parts by weight of wet silica) of sulfur-containing silane coupling agent (Cabrus 2B manufactured by Daiso Co., Ltd.), and 3 g of 90% DL-Lactic acid (manufactured by Musashino Chemical Laboratory, Ltd.) were added. Then, the resulting mixed solution was stirred at room temperature (approximately 23° C.) for 24 hours. Note that pH of the mixed solution was 4.

Subsequently, by a spray drier manufactured by Nihon Buchi, the mixed solution was dried under a condition of a hot air temperature of 200° C. to obtain a powder.

Further, the powder thus obtained was dried in an oven at 150° C. for 6 hours to obtain a filler 2.

Example 3: Production of Filler 3

To 2 kg of wet silica slurry which is an aqueous dispersion containing 10% by weight of Tokusil 233 (manufactured by OSC; BET specific surface area of 120 m$^2$/g), 0.02 g (0.01 parts by weight per 100 parts by weight of wet silica) of polyoxyethylene oleic acid ester (trade name: H-3549A (manufactured by Dai-ichi Kogyo Seiyaku Co., Ltd.); HLB value: 8) and 8 g (4 parts by weight per 100 parts by weight of wet silica) of sulfur-containing silane coupling agent (Cabrus 2B manufactured by Daiso Co., Ltd.) were added. Then, the resulting mixed solution was stirred at room temperature (approximately 23° C.) for 24 hours. Note that pH of the mixed solution was 6.

Subsequently, by a spray drier manufactured by Nihon Buchi, the mixed solution was dried under a condition of a hot air temperature of 200° C. to obtain a powder.

Further, the powder thus obtained was dried in an oven at 150° C. for 6 hours to obtain a filler 3.

Example 4: Production of Filler 4

To 2 kg of wet silica slurry which is an aqueous dispersion containing 15% by weight of Tokusil USG-L (manufactured by OSC; BET specific surface area of 150 m$^2$/g), 0.9 g (0.3 parts by weight per 100 parts by weight of wet silica) of polyoxyethylene oleic acid ester (trade name: H-3549A (manufactured by Dai-ichi Kogyo Seiyaku Co., Ltd.); HLB value: 8) and 45 g (15 parts by weight per 100 parts by weight of wet silica) of sulfur-containing silane coupling agent (Cabrus 2B manufactured by Daiso Co., Ltd.) were added. Then, the resulting mixed solution was stirred at room temperature (approximately 23° C.) for 24 hours. Note that pH of the mixed solution was 7.

Subsequently, by a spray drier manufactured by Nihon Buchi, the mixed solution was dried under a condition of a hot air temperature of 200° C. to obtain a powder.

Further, the powder thus obtained was dried in an oven at 150° C. for 6 hours to obtain a filler 4.

Example 5: Production of Filler 5

To 2 kg of wet silica slurry which is an aqueous dispersion containing 10% by weight of Tokusil 255EG (manufactured by OSC; BET specific surface area of 165 m$^2$/g), 0.4 g (0.2 parts by weight per 100 parts by weight of wet silica) of polyoxyethylene oleic acid ester (trade name: H-3549A (manufactured by Dai-ichi Kogyo Seiyaku Co., Ltd.); HLB value: 8) and 20 g (10 parts by weight per 100 parts by weight of wet silica) of sulfur-containing silane coupling agent (Cabrus 2B manufactured by Daiso Co., Ltd.) were added. Then, the resulting mixed solution was stirred at 60° C. for 4 hours. Note that pH of the mixed solution was 5.

Subsequently, by a spray drier manufactured by Nihon Buchi, the mixed solution was dried under a condition of a hot air temperature of 200° C. to obtain a powder.

Further, the powder thus obtained was dried in an oven at 150° C. for 6 hours to obtain a filler 5.

Example 6: Production of Filler 6

To 8 kg of wet silica slurry which is an aqueous dispersion containing 17% by weight of Tokusil 233 (manufactured by OSC; BET specific surface area of 120 m$^2$/g), 10 g (0.74 parts by weight per 100 parts by weight of wet silica) of polyoxyethylene oleic acid ester (trade name: H-3549A (manufactured by Dai-ichi Kogyo Seiyaku Co., Ltd.); HLB value: 8) and 200 g (14.7 parts by weight per 100 parts by weight of wet silica) of sulfur-containing silane coupling agent (Cabrus 2B manufactured by Daiso Co., Ltd.) were added. Then, the resulting mixed solution was stirred at 40° C. for 1 hour. Note that pH of the mixed solution was 6.

Subsequently, by a self-made spray drier, the mixed solution was dried under a condition of a hot air temperature of 900° C. to obtain a powder that serves as a filler 6.

Example 7: Production of Filler 7

To 2 kg of wet silica slurry which is an aqueous dispersion containing 15% by weight of Tokusil 233 (manufactured by OSC; BET specific surface area of 120 m$^2$/g), 0.9 g (0.3 parts by weight per 100 parts by weight of wet silica) of polyoxyethylene oleic acid ester (trade name: H-3549C (manufactured by Dai-ichi Kogyo Seiyaku Co., Ltd.); HLB value: 7) and 45 g (15 parts by weight per 100 parts by weight of wet silica) of sulfur-containing silane coupling agent (Cabrus 2B manufactured by Daiso Co., Ltd.) were added. Then, the resulting mixed solution was stirred at room temperature (approximately 23° C.) for 24 hours. Note that pH of the mixed solution was 6.

Subsequently, by a spray drier manufactured by Nihon Buchi, the mixed solution was dried under a condition of a hot air temperature of 200° C. to obtain a powder.

Further, the powder thus obtained was dried in an oven at 150° C. for 6 hours to obtain a filler 7.

Example 8: Production of Filler 8

To 2 kg of wet silica slurry which is an aqueous dispersion containing 15% by weight of Tokusil 233 (manufactured by OSC; BET specific surface area of 120 m$^2$/g), 0.9 g (0.3 parts by weight per 100 parts by weight of wet silica) of polyoxyethylene oleic acid ester (trade name: H-3549B (manufactured by Dai-ichi Kogyo Seiyaku Co., Ltd.); HLB value: 9) and 45 g (15 parts by weight per 100 parts by weight of wet silica) of sulfur-containing silane coupling agent (Cabrus 2B manufactured by Daiso Co., Ltd.) were added. Then, the resulting mixed solution was stirred at room temperature (approximately 23° C.) for 24 hours. Note that pH of the mixed solution was 6.

Subsequently, by a spray drier manufactured by Nihon Buchi, the mixed solution was dried under a condition of a hot air temperature of 200° C. to obtain a powder.

Further, the powder thus obtained was dried in an oven at 150° C. for 6 hours to obtain a filler 8.

Example 9: Production of Filler 9

To 4 kg of wet silica slurry which is an aqueous dispersion containing 15% by weight of Tokusil 233 (manufactured by OSC; BET specific surface area of 150 m$^2$/g), 9 g (1.5 parts by weight per 100 parts by weight of wet silica) of polyoxyethylene oleic acid ester (trade name: H-3549A (manufactured by Dai-ichi Kogyo Seiyaku Co., Ltd.); HLB value: 8) and 90 g (15 parts by weight per 100 parts by weight of wet silica) of sulfur-containing silane coupling agent (Cabrus 4 manufactured by Daiso Co., Ltd.) were added. Then, the resulting mixed solution was stirred at 40° C. for 1 hour. Note that pH of the mixed solution was 7.

Subsequently, by a self-made spray drier, the mixed solution was dried under a condition of a hot air temperature of 1000° C. to obtain a powder that serves as a filler 9.

Comparative Example 1: Production of Filler 10

Two-hundred grams of Tokusil 233 (manufactured by OSC; BET specific surface area of 120 m$^2$/g) was placed into Supermixer Piccolo manufactured by Kawata MFG Co., Ltd. and stirred at 1000 rpm with the addition of 1 g of 90% DL-Lactic acid (manufactured by Musashino Chemical Laboratory, Ltd.). Further, the mixture was stirred for 15 minutes.

Subsequently, the mixture was stirred at 1000 rpm with the addition of 30 g of sulfur-containing silane coupling agent (Cabrus 4 manufactured by Daiso Co., Ltd.). After 45 minutes of stirring, a filler 10 was obtained.

Comparative Example 2: Production of Filler 11

To 2 kg of wet silica slurry which is an aqueous dispersion containing 15% by weight of Tokusil 233 (manufactured by OSC; BET specific surface area of 120 m$^2$/g), 0.9 g of NS soap (manufactured by Kao Chemicals) as an emulsifier and 45 g of sulfur-containing silane coupling agent (Cabrus 2B manufactured by Daiso Co., Ltd.) were added. Then, the mixture was stirred.

After 1 hour of stirring, the stirring was stopped. The sulfur-containing silane coupling agent was separated and floated over the surface of the slurry. As a result, the sulfur-containing silane coupling agent could not be dispersed in the wet silica slurry at all. For this reason, drying of the mixed solution was not performed.

Comparative Example 3: Production of Filler 12

To 2 kg of wet silica slurry which is an aqueous dispersion containing 15% by weight of Tokusil 233 (manufactured by OSC; BET specific surface area of 120 m$^2$/g), 0.9 g of polyoxyethylene stearic acid ester (trade name: H-3549S (manufactured by Dai-ichi Kogyo Seiyaku Co., Ltd.); HLB value: 8) and 45 g of sulfur-containing silane coupling agent (Cabrus 2B manufactured by Daiso Co., Ltd.) were added. Then, the resulting mixed solution was stirred at room temperature (approximately 23° C.) for 24 hours. Note that pH of the mixed solution was 6.

After 24 hours of stirring, the stirring was stopped. The sulfur-containing silane coupling agent was separated and floated over the surface of the slurry. As a result, the sulfur-containing silane coupling agent could not be dispersed in the wet silica slurry at all. For this reason, drying of the mixed solution was not performed.

<Solvent Extraction Test>

The filler contains not only a reaction product of the wet silica and the sulfur-containing silane coupling agent but also an unreacted portion of the sulfur-containing silane coupling agent.

A smaller amount of unreacted portion of the sulfur-containing silane coupling agent in the filler indicates that reaction between the wet silica and the sulfur-containing silane coupling agent proceeded more excellently.

Such a filler is excellent in conformability (such as, for example, compatibility, dispersibility, or kneading property) with various materials (such as, for example, a rubber, a resin, a paint, or a sealant) and is able to exhibit an excellent effect when the filler is used in combination with these materials. For example, mixing such a filler with a rubber realizes a tire with enhanced low-fuel consumption performance and enhanced wear resistance.

Since an unreacted portion, contained in the filler, of the sulfur-containing silane coupling agent is extracted by an organic solvent, it is possible to measure the amount of the unreacted portion through analysis of the organic solvent used for the extraction.

To this end, a solvent extraction test was conducted on the above-described fillers on a day after the fillers had been fabricated (approximately 16 hours after the fabrication of the fillers). Specifically, the solvent extraction test was conducted by the following procedure.

First, 10.0 g of filler was weighed into a glass container, and 50 ml of methyl ethyl ketone was then added to the glass container. Subsequently, the filler and methyl ethyl ketone in the glass container were stirred with a magnetic stirrer at 500 rpm for 10 minutes.

Then, a resulting mixture, which contains the methyl ethyl ketone and the filler, was subjected to filtration under reduced pressure to obtain a filtrate from which the filler had been removed. Further, a filtration residue containing the filler was rinsed 5 times with 5 mL of methyl ethyl ketone to collect the methyl ethyl ketone used for the rinsing.

The filtrate and the methyl ethyl ketone that had been used for the rinsing and collected were mixed, after which a resulting mixed solution was concentrated by use of a rotary evaporator under conditions of a reduced pressure of 20 mmHg and a temperature of 70° C. until the mixed solution reached equilibrium. Subsequently, the weight of an extract collected after the concentration under the reduced pressure (in other words, an unreacted portion of the sulfur-containing silane coupling agent) was measured.

Then, the extracted amount (%) was determined so as to be expressed as an extract's percentage by weight per 10.0 g of filler.

Tables 1 and 2 below show test results.

As shown in Tables 1 and 2, the extracted amounts are small in the fillers in Examples. This reveals that the wet silica and the sulfur-containing silane coupling agent are reacted well (in other words, the amount of unreacted portion of the sulfur-containing silane coupling agent is small). This shows that the fillers in Examples can be suitably used as a filler.

TABLE 1

| | Examples | | | | | | | | |
|---|---|---|---|---|---|---|---|---|---|
| | 1 | 2 | 3 | 4 | 5 | 6 | 7 | 8 | 9 |
| Extracted Amount (%) | 0.4 | 0.3 | 0.1 | 0.6 | 0.3 | 0.3 | 0.5 | 0.2 | 0.4 |

TABLE 2

| | Comparative Examples | | |
|---|---|---|---|
| | 1 | 2 | 3 |
| Extracted Amount (%) | 5.8 | Not tested | Not tested |

INDUSTRIAL APPLICABILITY

The present invention can be widely used in the fields in which fillers for modifying the properties of materials are utilized. For example, the present invention is applicable in the field of rubber industry (e.g., the manufacture of tires) and the like field.

The invention claimed is:

1. A filler composition comprising:
   wet silica;
   a polyoxyethylene unsaturated fatty acid ester consisting of polyoxyethylene moiety and unsaturated fatty acid having 12 to 26 carbon atoms, which is obtained by addition polymerization of ethylene oxide to the unsaturated fatty acid having 12 to 26 carbon atoms; and
   a sulfur-containing silane coupling agent,
   wherein the wet silica is a wet silica slurry,
   wherein the polyoxyethylene unsaturated fatty acid ester has a hydroplane lipophile balance (HLB) value of 5 to 10 wherein the B value is calculated as follows:
   HLB value=20×sum total of formula weights of hydrophilic portion/molecular weight of the polyoxyethylene unsaturated fatty acid ester.

2. The filler composition according to claim 1, wherein the sulfur-containing silane coupling agent is at least one selected from the group consisting of a sulfur-containing silane coupling agent represented by the following Formula I:

[Chem. 1]

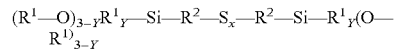
   $(R^1-O)_{3-Y}R^1_Y-Si-R^2-S_x-R^2-Si-R^1_Y(O-R^1)_{3-Y}$  [I]

wherein each $R^1$ is independently a monovalent hydrocarbon group having 1 to 18 carbon atoms, $R^2$ is a divalent hydrocarbon group having 1 to 9 carbon atoms, x is an integer of 2 to 6, and Y is an integer 0, 1, or 2,
   and a sulfur-containing silane coupling agent represented by the following Formula II:

[Chem. 2]

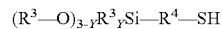
   $(R^3-O)_{3-Y}R^3_YSi-R^4-SH$  [II]

wherein each $R^3$ is independently a monovalent hydrocarbon group having 1 to 18 carbon atoms, $R^4$ is a divalent hydrocarbon group having 1 to 9 carbon atoms, and Y is an integer 0, 1, or 2.

3. The filler composition according to claim 1, wherein the filler composition contains 1 to 20 parts by weight of the sulfur-containing silane coupling agent per 100 parts by weight of the wet silica.

4. The filler composition according to claim 1, wherein the filler composition contains 0.001 to 5 parts by weight of the polyoxyethylene unsaturated fatty acid ester per 100 parts by weight of the wet silica.

5. The filler composition according to claim 1, wherein the wet silica has a BET specific surface area of 50 to 300 $m^2/g$.

6. The filler composition according to claim 1, further comprising at least one selected from the group consisting of a basic substance and an acidic substance.

7. The filler composition according to claim 6, wherein the basic substance is at least one selected from the group consisting of a monoalkyl amine, a dialkylamine and a trialkylamine each of which has an alkyl group of 1 to 24 carbon atoms and optionally may have a hydroxyl group.

8. The filler composition according to claim 6, wherein the acidic substance is at least one selected from the group consisting of a (poly)carboxylic acid and a hydroxy acid each of which has 1 to 18 carbon atoms.

9. A method for producing a filler composition recited in claim 1, the method comprising:
mixing the wet silica, the polyoxyethylene unsaturated fatty acid ester, and the sulfur-containing silane coupling agent at 10° C. to 120° C. for 10 minutes to 24 hours.

10. The method according to claim 9, wherein the mixing is performed under a condition of pH of 4 to 10.

11. A filler obtained from a filler composition recited in claim 1.

12. A filler comprising:
wet silica;
a polyoxyethylene unsaturated fatty acid ester consisting of polyoxyethylene moiety and unsaturated fatty acid having 12 to 26 carbon atoms, which is obtained by addition polymerization of ethylene oxide to the unsaturated fatty acid having 12 to 26 carbon atoms; and
a sulfur-containing silane coupling agent,
the filler containing 4 to 20 parts by weight of the sulfur-containing silane coupling agent per 100 parts by weight of the wet silica,
the filler containing 0.001 to 5 parts by weight of the polyoxyethylene unsaturated fatty acid ester per 100 parts by weight of the wet silica,
wherein the polyoxyethylene unsaturated fatty acid ester has a hydrophile lipophile balance (HLB) value of 5 to 10 wherein the HLB value is calculated as follows:
HLB value 20×sum total of formula weights of hydrophilic portion/molecular weight of the polyoxyethylene unsaturated fatty acid ester.

13. The filler according to claim 11, wherein an extracted amount of the sulfur-containing silane coupling agent when the filler is subjected to solvent extraction accounts for not more than 2% by weight of an amount of the filler.

14. A method for producing a filler, comprising the step of:
drying a filler composition recited in claim 1.

15. The method according to claim 14, wherein the drying step includes a step of drying the filler composition by a spray-dry method.

16. The method according to claim 14, further comprising the step of:
heating a dry product obtained by the drying step at 80° C. to 200° C. for 10 minutes to 24 hours.

17. The filler according to claim 12, wherein an extracted amount of the sulfur-containing silane coupling agent when the filler is subjected to solvent extraction accounts for not more than 2% by weight of an amount of the filler.

18. The filler composition according to claim 1, wherein the wet silica slurry contains a solid content accounting for 5 to 50% by weight of the wet silica slurry.

19. The filler according to claim 11, wherein the filler is a silica particle to which a sulfur-containing silane coupling agent is bound.

20. The filler according to claim 12, wherein the filler is a silica particle to which a sulfur-containing silane coupling agent is bound.

21. The method according to claim 14, wherein the filler is a silica particle to which a sulfur-containing silane coupling agent is bound.

22. The filler according to claim 1, wherein the sulfur-containing silane coupling agent enters not only the surface of an aggregate of silica particles but also the interior of the aggregate of the silica particles due to the presence of the polyoxyethylene unsaturated fatty acid ester.

23. The filler according to claim 12, wherein the sulfur-containing silane coupling agent enters not only the surface of an aggregate of silica particles but also the interior of the aggregate of the silica particles due to the presence of the polyoxyethylene unsaturated fatty acid ester.

* * * * *